(12) United States Patent
Balakrishnan et al.

(10) Patent No.: US 7,148,671 B2
(45) Date of Patent: *Dec. 12, 2006

(54) METHOD AND APPARATUS FOR MAINTAINING AN APPROXIMATE CONSTANT CURRENT OUTPUT CHARACTERISTIC IN A SWITCHED MODE POWER SUPPLY

(75) Inventors: Balu Balakrishnan, Saratoga, CA (US); Alex B. Djenguerian, Saratoga, CA (US); Kent Wong, Fremont, CA (US); David Michael Hugh Matthews, Sunnyvale, CA (US); Erdem Bircan, Redwood, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/244,469

(22) Filed: Oct. 6, 2005

(65) Prior Publication Data

US 2006/0028190 A1  Feb. 9, 2006

Related U.S. Application Data

(63) Continuation of application No. 10/987,525, filed on Nov. 12, 2004, now Pat. No. 6,967,472, which is a continuation of application No. 10/346,808, filed on Jan. 16, 2003, now Pat. No. 6,833,692.

(60) Provisional application No. 60/350,158, filed on Jan. 17, 2002.

(51) Int. Cl.
*G05F 1/56* (2006.01)

(52) U.S. Cl. .............. 323/284; 363/21.01; 363/21.12; 363/97

(58) Field of Classification Search ................ 323/282, 323/284; 363/21.01, 21.04, 21.12, 97
See application file for complete search history.

(56) References Cited

U.S. PATENT DOCUMENTS 3,836,979 A  9/1974  Kurland et al.

(Continued)

FOREIGN PATENT DOCUMENTS

EP  0585788 A1  3/1994

(Continued)

OTHER PUBLICATIONS

Leman, B. R., "Three-Terminal Power IC Cuts Off-Line Flyback Switcher Size and Cost," Power Integrations, Inc., Mountain View, California, PCIM, (Aug. 1995), pp. 15-28.

*Primary Examiner*—Jeffrey Sterrett
(74) *Attorney, Agent, or Firm*—Blakely Sokoloff Taylor & Zafman LLP

(57) ABSTRACT

A regulator circuit maintaining an approximate constant current output characteristic. In one aspect, a disclosed regulator controls a switch that has a current limit threshold. A supply terminal and feedback terminal of the regulator are connected together as a control terminal such that a shunt regulator current is the control terminal current in excess of the internal supply current consumed by the regulator. The current limit threshold of the switch is changed as a function of the shunt regulator current. In another aspect, a control input of the regulator circuit receives a current that is the sum of the internal supply current consumed by the regulator circuit and a feedback current. The feedback current is a fraction of the consumption current of the regulator circuit and the current limit threshold of the switch is changed as a function of the feedback current.

6 Claims, 7 Drawing Sheets

U.S. PATENT DOCUMENTS

| | | | |
|---|---|---|---|
| 4,068,238 A | 1/1978 | Acker | |
| 4,532,742 A | 8/1985 | Miura | |
| 4,662,130 A | 5/1987 | Miura et al. | |
| 5,285,366 A | 2/1994 | Zaretsky | |
| 5,313,381 A | 5/1994 | Balakrishnan | |
| 5,675,485 A | 10/1997 | Seong | |
| 5,973,945 A | 10/1999 | Balakrishnan et al. | |
| 5,977,932 A | 11/1999 | Robinson | |
| 6,147,883 A | 11/2000 | Balakrishnan et al. | |
| 6,154,377 A | 11/2000 | Balakrishnan et al. | |
| 6,212,079 B1 | 4/2001 | Balakrishnan et al. | |
| 6,226,190 B1 | 5/2001 | Balakrishnan et al. | |
| 6,233,161 B1 | 5/2001 | Balakrishnan et al. | |
| 6,321,503 B1 | 11/2001 | Warren | |
| 6,324,079 B1 | 11/2001 | Collmeyer et al. | |
| 6,337,788 B1 | 1/2002 | Balakrishnan et al. | |
| 6,345,482 B1 | 2/2002 | Warren | |
| 6,480,399 B1 | 11/2002 | Balakrishnan et al. | |
| 6,833,692 B1 | 12/2004 | Balakrishnan et al. | |
| 6,967,472 B1 * | 11/2005 | Balakrishnan et al. | 323/284 |
| 2002/0124518 A1 | 9/2002 | Warren et al. | |

FOREIGN PATENT DOCUMENTS

| | | |
|---|---|---|
| WO | PCT/US02/01156 | 5/2003 |

* cited by examiner

OUTPUT CURRENT MAY 'FOLD BACK' AT LOW FEEDBACK CURRENT - SEE FIG. 7

METHOD AND APPARATUS FOR MAINTAINING AN APPROXIMATE CONSTANT CURRENT OUTPUT CHARACTERISTIC IN A SWITCHED MODE POWER SUPPLY

REFERENCE TO PRIOR APPLICATIONS

This application is a continuation of U.S. application Ser. No. 10/987,525, filed Nov. 12, 2004 now U.S. Pat. No. 6,967,472, which is a continuation of U.S. application Ser. No. 10/346,808, filed Jan. 16, 2003, now issued as U.S. Pat. No. 6,833,692 B2, which claims the benefit of and claims priority to U.S. provisional application Ser. No. 60/350,158, filed Jan. 17, 2002, entitled "Method And Apparatus For Maintaining An Approximate Constant Current Output Characteristic In A Switched Mode Power Supply."

BACKGROUND OF THE INVENTION

1. Field of the Invention

This invention relates generally to power supplies, and more specifically, to a switched mode power supply.

2. Background Information

In many electronic device applications, especially the low power off-line adapter/charger market, an approximately constant voltage/constant current output characteristic is required. Known switched mode power supply circuits providing constant output current and voltage characteristics typically use circuitry on the secondary (or output side) of the power supply that sense output voltage and current and generate a feedback signal. The feedback signal is typically communicated to a regulator circuit on the primary side of the power supply through an opto coupler component. This feedback signal is then used to control the switching of a primary switch to provide the required power supply output characteristic.

The specific function of maintaining constant output current is normally achieved with secondary current sense resistors in series with the output load that provide a voltage signal proportional to the current flowing through the secondary current sense resistors. This voltage signal is then used to provide a feedback signal, which in turn is used to control the power switch.

Another technique to provide an approximately constant output current is to derive information about the output voltage of the power supply from an auxiliary winding of the power supply transformer on the primary side of the power supply. This information is then used to adjust the primary switch current limit threshold independent of any supply current required by the primary regulator circuit.

SUMMARY OF THE INVENTION

A regulator circuit maintaining an approximate constant current output characteristic is disclosed. In one aspect, a disclosed regulator circuit controls a switch that has a current limit threshold. A supply terminal and feedback terminal of the regulator are connected together as a control terminal such that a shunt regulator current is the control terminal current in excess of the internal consumption of the internal supply current of the regulator. The current limit threshold of the switch is changed as a function of the shunt regulator current. In one embodiment, the connection of the supply terminal and feedback terminal is external to the regulator. In another embodiment, the connection of the supply terminal and feedback terminal is internal to the regulator. In one embodiment, the current limit threshold of the switch is increased with increasing shunt regulator current. In another embodiment, the current limit threshold of the switch is decreased with increasing shunt regulator current. In one embodiment, the switch and regulator are integrated on a monolithic chip. In one embodiment, the switch is a metal oxide field effect transistor (MOSFET). In another embodiment, the switch is a bipolar transistor. In one embodiment, the regulator is used in a switching power supply. In one embodiment, the regulator is used in a switching power supply with an approximately constant output voltage and output current characteristic.

In another aspect, a disclosed regulator circuit controls a switch that has a current limit threshold. A control input of the regulator circuit receives a current that is the sum of the internal supply current consumed by the regulator circuit and a feedback current. The current limit threshold of the switch is changed as a function of the feedback current. In one embodiment, the current limit threshold of the switch is increased with increasing feedback current. In another embodiment, the current limit threshold of the switch is decreased with increasing feedback current. In one embodiment, the switch and regulator are integrated on to a monolithic chip. In one embodiment, the switch is a MOSFET. In another embodiment, the switch is a bipolar transistor. In one embodiment, the regulator is used in a switching power supply. In another embodiment, the regulator is used in a switching power supply with an approximately constant output voltage and output current characteristic. Additional features and benefits of the present invention will become apparent from the detailed description and figures set forth below.

BRIEF DESCRIPTION OF THE DRAWINGS

The present invention detailed is illustrated by way of example and not limitation in the accompanying figures.

DETAILED DESCRIPTION

Figure 1:
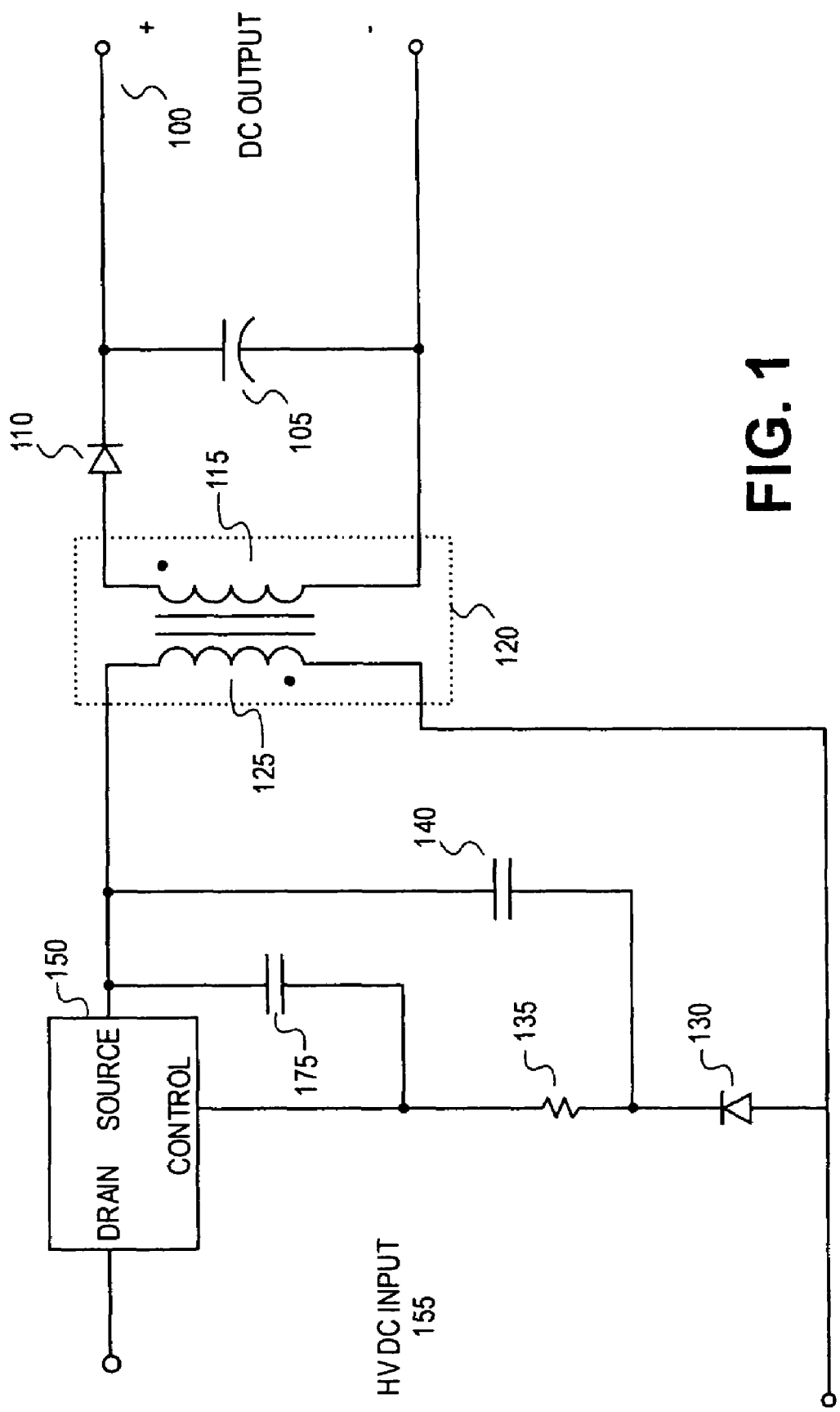
FIG. 1 shows one embodiment of a power supply that has an approximately constant voltage and constant current output characteristic in accordance with the teachings of the present invention

Embodiments of methods and apparatuses maintaining an approximate constant current output characteristic with a regulator circuit are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Various embodiments according to the teachings of the present invention are directed to power supply regulators that provide approximately constant voltage/constant current output characteristics without the need for secondary feedback from a source such as an opto-coupler. As will be shown, embodiments include methods of adjusting the duty cycle and current limit of the power switch as a function of control current in order to maintain this approximately constant voltage/constant current output characteristic. In addition, embodiments according to the teachings of the present invention include a regulator circuit that derives feedback information on the power supply output voltage from a control current that combines both the feedback current and internal supply current for the regulator circuit.

In one embodiment, a method according to the teachings of the present invention of generating an approximately constant voltage/constant current output characteristic involves adjusting the current limit threshold and duty cycle of a power switch as a function of the control current the regulator receives. The level of the control current determines the mode of operation of the regulator. At lower control current levels, the regulator maintains an approximately constant output current. In one embodiment, this is done by increasing the current limit threshold of the switch as the control current increases. At higher control current levels, the regulator maintains an approximately constant output voltage by reducing the duty cycle.

In one embodiment, the feedback information is derived from a reflected voltage, which to the first order, is equal to the output voltage multiplied by the transformer turns ratio. In one embodiment, the reflected voltage is the voltage reflected across an energy transfer element from the secondary side to the primary side. The reflected voltage information is converted to a control current and delivered to a control terminal of the regulator. The regulator includes a supply terminal and a feedback terminal that are connected either internal to the regulator or external to the regulator to form the control terminal.

In one embodiment, the feedback terminal includes a shunt regulator responsive to the control current at the control terminal in excess of the internal supply current consumed by the chip regulator required by the supply terminal. A current limit circuit including a comparator is used to set the current limit of the power switch in the regulator. The current limit is responsive to the shunt regulator current. In one embodiment, as the shunt regulator current increases, the current limit threshold is increased to provide an approximately constant power supply output current characteristic. The reflected voltage in a switch mode power supply does not vary linearly with the output voltage of the switch mode power supply, so in one embodiment there may be different slopes of current limit at different levels of shunt regulator current. The current limit includes one or more different ratios of the shunt regulator current at one or more shunt regulator current points.

As stated earlier, the adjustment of the current limit threshold to maintain an approximately constant output current characteristic only occurs at lower control current levels. At higher control current levels, the regulator maintains an approximately constant output voltage by modulating the duty cycle based on the shunt regulator current in excess of a threshold. The shunt regulator current is the control current in excess of the internal supply current consumed by the chip. The shunt regulator current is converted to a voltage level across a reference resistor and is used to modulate the duty cycle. The voltage level across the reference resistor is substantially zero until the shunt regulator current threshold is reached, at which point the voltage level across the reference resistor starts to increase in proportion to the shunt regulator current.

FIG. 1 shows one embodiment of a switching power supply that has an approximately constant voltage and constant current output characteristic in accordance with the teachings of the present invention. The feedback information is provided to the power supply regulator 150 at its control terminal. The power supply regulator 150 also includes a power switch connected between the terminals Drain and Source. The current at the control terminal is proportional to the voltage across resistor 135, which in turn is responsive to the voltage at DC-output 100. In operation, current is enabled and disabled to flow through the power switch according to a duty cycle of the power switch. In one embodiment, power supply regulator 150 reduces the duty cycle of the power switch when the voltage across resistor 135 increases above a threshold, and the DC-output 100 is in voltage regulation mode. The power supply regulator 150 reduces the current limit threshold of the power switch when the voltage across resistor 135 decreases below a threshold. In one embodiment, the current limit threshold is reduced as a function of the voltage across resistor 135 to keep the output load current approximately constant. Thus, the load current is controlled by the current limit threshold of the power switch in power supply regulator 150.

In the depicted embodiment, capacitor 175 is the regulator's bypass capacitor, and capacitor 140 is the storage element for the reflected voltage reflected across energy transfer element 120 from secondary side 115 to primary side 125. The reflected voltage is fed via diode 130 in every cycle when the power switch is in the off-state. Diode 130 and capacitor 140 also act as the voltage clamp to protect the power switch in power supply regulator 150. On the secondary side 115 of the energy transfer element 120, the rectifier 110 rectifies the switched energy and storage element 105 stores the energy to be available at the DC output 100.

Figure 2:
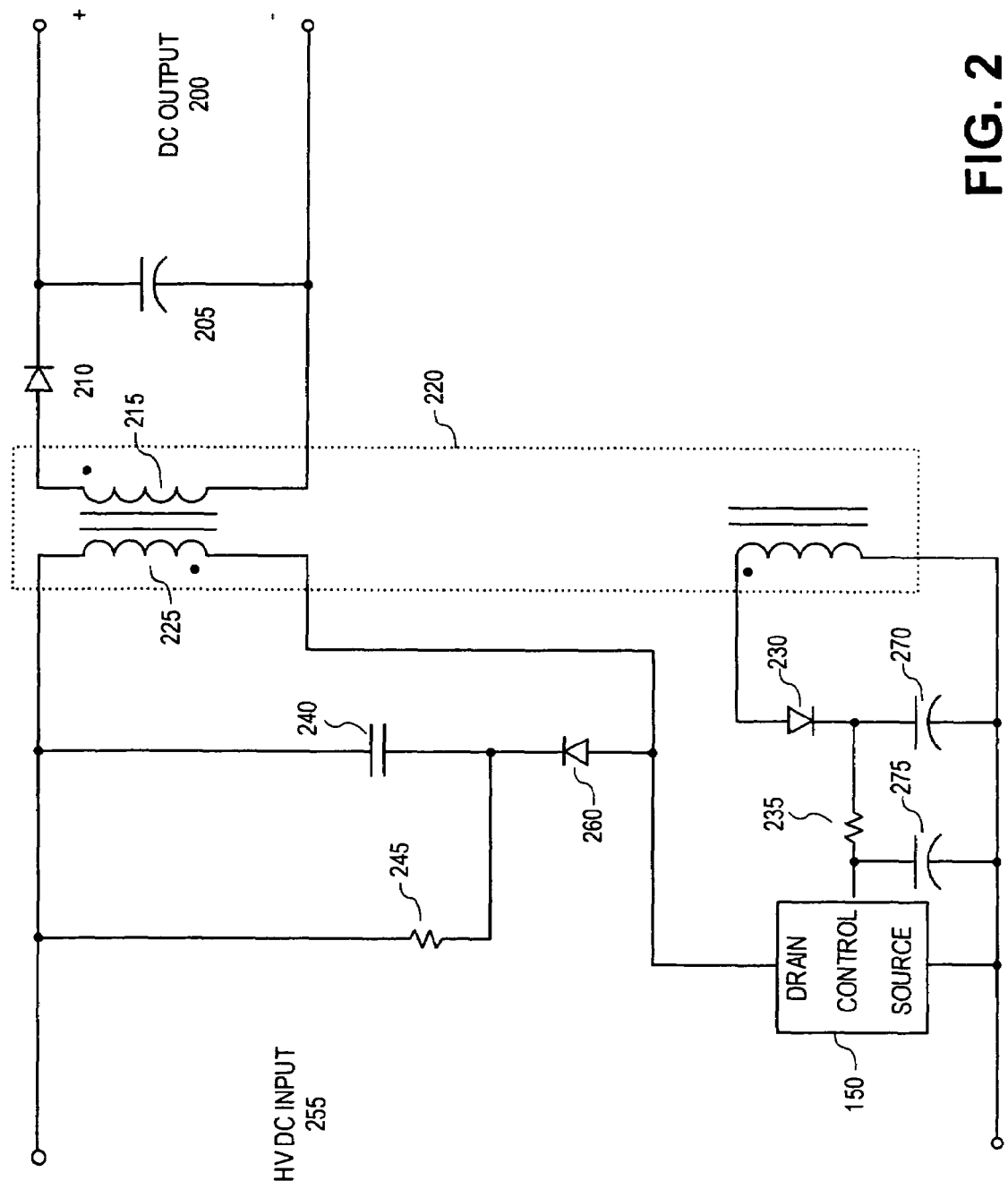
FIG. 2 shows another embodiment of a power supply in accordance with the teachings of the present invention where the energy transfer element has a separate feedback/bias winding for generating the control current to the regulator.

FIG. 2 shows another embodiment of a switching power supply where the energy transfer element 220 has a separate feedback/bias winding for generating the control current to the power supply regulator 150 in accordance with the teachings of the present invention. The power supply has an approximately constant voltage and constant current output characteristic. The feedback information is provided to the power supply regulator 150 at its control terminal. The regulator also includes a power switch connected between the terminals Drain and Source. The current at the control terminal is proportional to the voltage across resistor 235, which in turn is responsive to the voltage at DC-output 200. In one embodiment, power supply regulator 150 reduces the duty cycle of the power switch when the voltage across resistor 235 increases above a threshold, and the DC-output 200 is in voltage regulation mode. The power supply regulator 150 reduces the current limit threshold of the power switch when the voltage across resistor 235 decreases below a threshold. The current limit threshold is reduced as a function of the voltage across resistor 235 to keep the output load current approximately constant. Thus, the load current is controlled by the current limit threshold of the power switch in power supply regulator 150. Capacitor 275 is the regulator's bypass storage element, and capacitor 270 is the storage element for the reflected voltage reflected across energy transfer element 220 from secondary side 215 to the feedback/bias winding. The reflected voltage is fed via diode 230 in every cycle when the power switch is in the off-state. Diode 260, capacitor 240, and resistor 245 acts as the voltage clamp to protect the power switch in power supply regulator 150. On the secondary side 215 of the energy transfer element 220, the rectifier 210 rectifies the switched energy and storage element 205 stores the energy to be available at the DC output 200.

Figure 3:
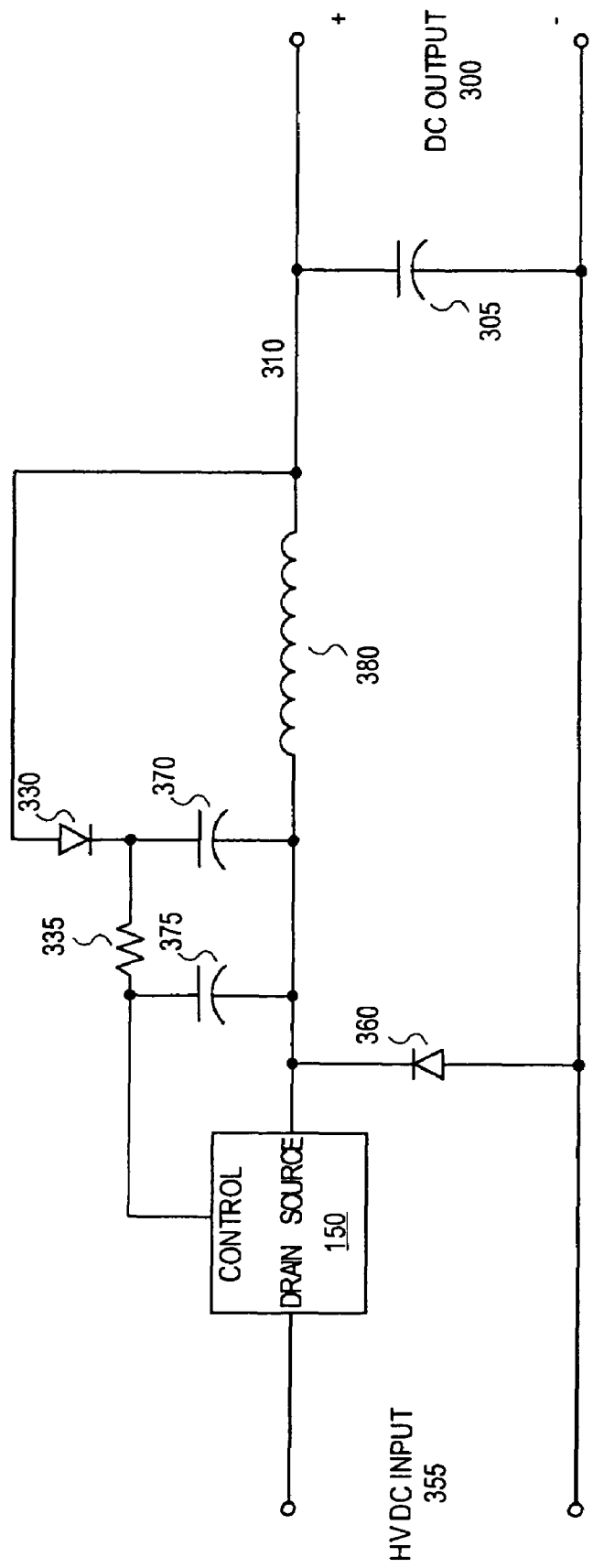
FIG. 3 shows yet another embodiment of a power supply that has an approximately constant voltage and constant current output characteristic in accordance with the teachings of the present invention.

FIG. 3 shows yet another embodiment of a switching power supply that has an approximately constant voltage and constant current output characteristic in accordance with the teachings of the present invention. The feedback information is provided to the power supply regulator 150 at its control terminal. The power supply regulator 150 also includes a power switch connected between the terminals Drain and Source. In one embodiment, the current at the control terminal of power supply regulator 150 is proportional to the voltage across resistor 335, which in turn is proportional to the voltage at DC-output 300. In one embodiment, the power supply regulator 150 reduces the duty cycle of the power switch when the voltage across resistor 335 increases above a threshold, and the DC-output 300 is in voltage regulation mode. The power supply regulator 150 reduces the current limit threshold of the power switch when the voltage across resistor 335 decreases. The current limit threshold is reduced as a function of the voltage across resistor 335 to control the output load current approximately constant. Capacitor 375 is the regulator's bypass storage element, and capacitor 370 is the storage element for the voltage on the DC output 300, which is fed back via diode 330. On one side of the inductive energy transfer element 380, the energy transferred is stored in storage element 305 to be available at the DC output 300. The inductive energy transfer element 380 stores energy during the active part of the cycle when the power supply regulator 150 is conducting current between drain and source. The stored energy will be delivered to node 310 during the inactive part of the cycle through diode 360.

Figure 4:
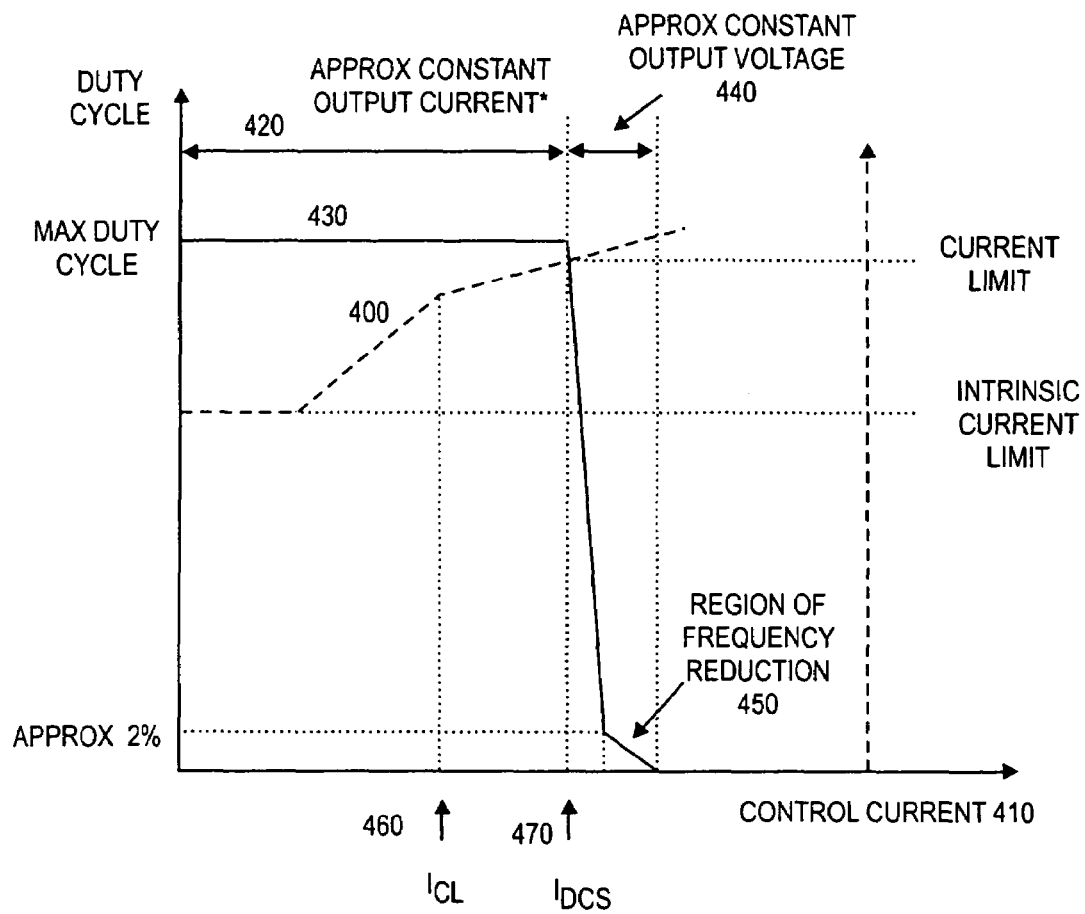
FIG. 4 shows one embodiment of the transfer function of a regulator circuit in a switched-mode power supply in accordance with the teachings of the present invention.

FIG. 4 shows one embodiment of the transfer function of the power supply regulator 150 in a switched-mode power supply in accordance with the teachings of the present invention. Curve 400 shows one embodiment of the current limit characteristic of the power switch as a function of the control terminal current 410. The left-hand portion 420 of this diagram relates to the constant output current portion of the characteristic. In one embodiment, in order to maintain an approximately constant output current, the current limit threshold is gradually ramped as a function of control terminal current. As described earlier, the slope of current limit threshold versus control current is not necessarily constant. Different slopes can occur at different points of control terminal current. Curve 430 is a plot of the duty cycle as a function of the control terminal current 410. The right-hand portion relates to the constant output voltage section 440 of the characteristic. As can be seen in the curve, the duty cycle reduction only occurs after the control current exceeds a control current threshold. When the duty cycle goes below about 2%, the region of frequency reduction 450 is entered, and the switching frequency is reduced.

Figure 5:
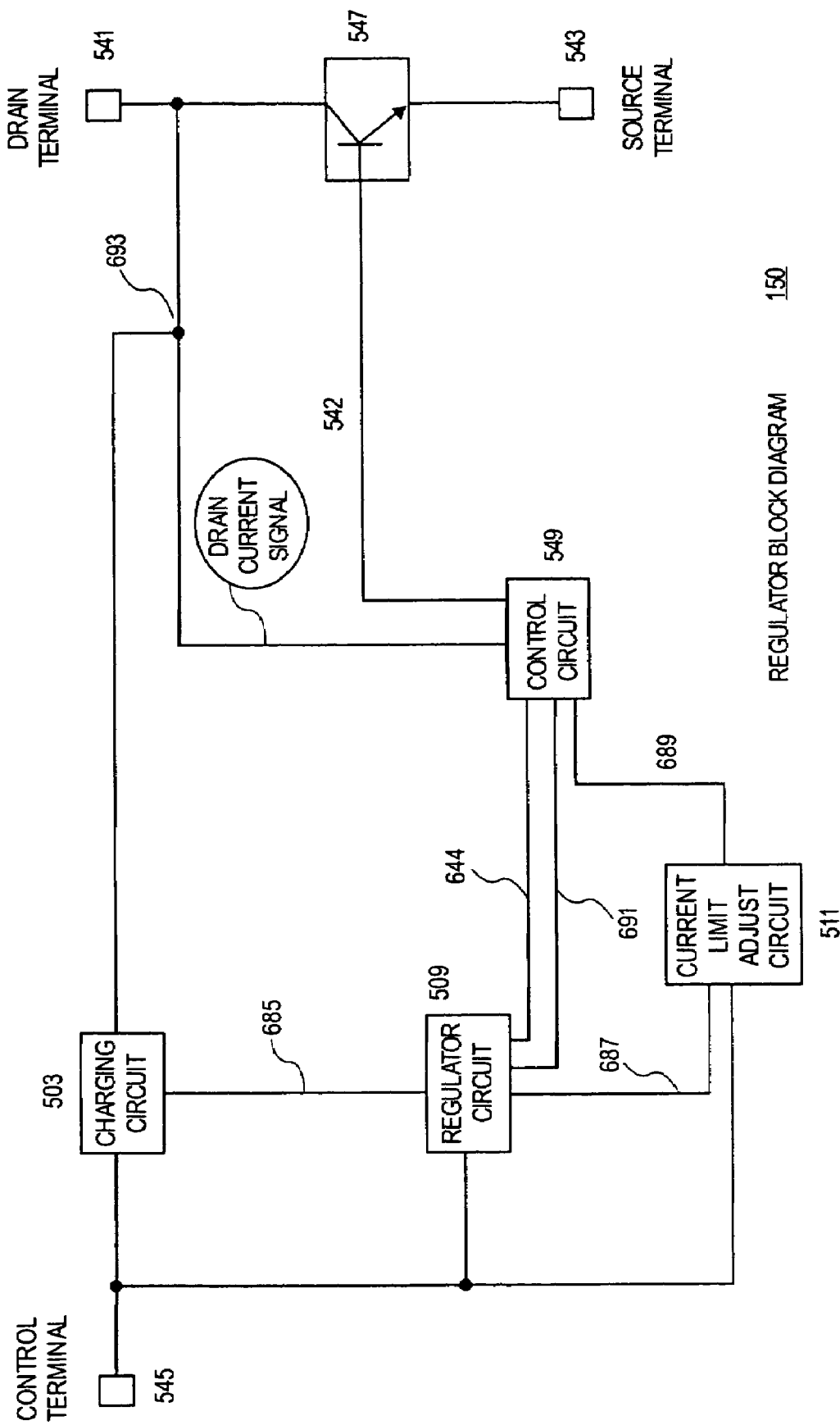
FIG. 5 is a block diagram of one embodiment of the regulator circuit, as seen in FIGS. 1, 2 and 3 in accordance with the teachings of the present invention.

FIG. 5 is a block diagram of one embodiment of the power supply regulator 150, as seen for example in FIGS. 1, 2 and 3 in accordance with the teachings of the present invention. In one embodiment, power supply regulator 150 is implemented in a monolithic chip. In another embodiments, it is appreciated that some functions of power supply regulator 150 may be included externally, such as for example power switch 547. In one embodiment, power supply regulator 150 may be included in a switching power supply. As shown in the depicted embodiment, power supply regulator 150 includes three terminals, control terminal 545, drain terminal 541, and source terminal 543. Power supply regulator 150 also includes charging circuit 503, control terminal regulator circuit 509, current limit adjust block 511, power switch 547, and power switch control circuit 549. Control terminal regulator circuit 509 and charging circuit 503 maintain the control terminal 545 at a predetermined constant voltage level. Control terminal regulator circuit 509 also accepts the feedback based on the control current from the control terminal 545 and converts it to signals that are sent to adjust the duty cycle in control circuit 549 and the current limit threshold in current limit adjust circuit 511. The control current from the control terminal 545 is used to adjust both the current limit threshold and it's slope. The initiation of the duty cycle adjustment is controlled by a control current threshold. The control circuit 549 determines when power switch 547 is to begin switching. Termination of switching is controlled by the magnitude of the control current from the control terminal 545 and will be either duty cycle limited or current limit threshold terminated by control circuit 549, depending on the region of operation. The information about the current level in power switch 547 is fed back to the current limit circuitry in control circuit 549 from the drain terminal 541.

Figure 6:
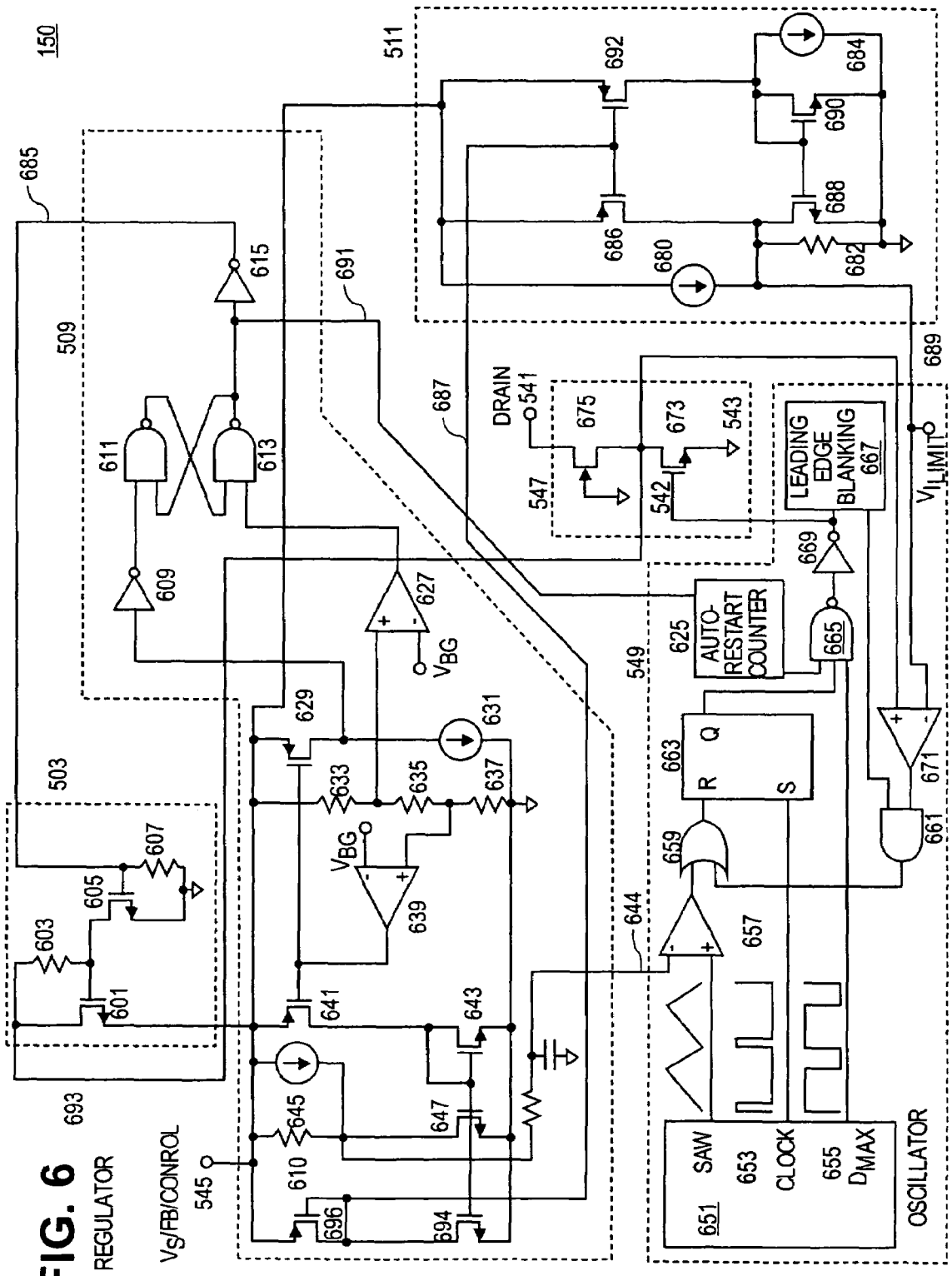
FIG. 6 is a schematic illustrating one embodiment of a power supply regulator circuit in accordance with teachings of the present invention.

FIG. 6 is a schematic illustrating one embodiment of a power supply regulator 150 in accordance with teachings of the present invention. Power switch 547 is coupled between drain terminal 541 and source terminal 543. In one embodiment, the source terminal 543 is coupled to ground. A control terminal regulator circuit 509 is coupled to control circuit 549 through signal 644. In one embodiment, control terminal 545 is the combined electrical terminal providing internal supply current and feedback current to all blocks of the power supply regulator 150. Indeed, in the illustrated embodiment, control terminal 545 serves as both a supply terminal to receive the internal supply current and a feedback terminal to receive the feedback current. In the illustrated embodiment, it is appreciated that the feedback terminal and supply terminal are connected internal to power supply regulator 150 to form the combined electrical terminal of control terminal 545. In another embodiment, it is appreciated that connecting the feedback terminal and the supply terminal external to power supply regulator 150 may also form the combined electrical terminal of control terminal 545. In one embodiment, control terminal regulator circuit 509 includes a shunt regulator block, which includes comparator 639, resistors 633, 635 and 637, and transistors 641 and 643.

Current limit function of power supply regulator 150 is provided by comparator 671, leading-edge blanking circuit 667 and AND gate 661. When the control current is below the duty cycle adjustment threshold, the control current modulates the current limit threshold. The current mirror formed by transistors 694 and 643 mirrors the shunt regulator current such that it can be utilized to modulate the current limit threshold. For example, in one embodiment, the current limit threshold is increased with an increase in the shunt regulator current or feedback current. In another embodiment, the current limit threshold is decreased with an increase in the shunt regulator current or feedback current. The modulation occurs as soon as the control terminal current exceeds the internal supply current of the chip. This excess current through transistor 643 is the shunt regulator current or the feedback current. As the current through transistor 694 increases, the current through transistor 696 increases by an identical amount. The current through transistor 686 of current limit adjust circuit 511 increases linearly with the current through transistor 696. The intrinsic current limit is set by current source 680. This intrinsic current limit is the current limit threshold of the power switch when the control current is below the internal supply current of the chip. Once the control current exceeds the internal supply current of the chip, the current through transistor 686 increases with respect to the control terminal current. Since transistor 686 is in parallel with current source 680, this increase of the control current results in the increase of the current limit threshold. This increase of the current limit threshold is designed such that the output current is maintained at an approximately constant level in this region of operation. Different slopes are required at different values of control current due to the fact that non-linearities exist in the relationship between the reflected voltage and the output voltage, and non-linearities exist between the power switch drain current and power supply output current. In theory, these different slopes for different points of the curve of current limit threshold as a function of control current can be obtained through cancellation circuitry. This cancellation circuitry consists of transistors 692, 690, 688, and current source 684. The current through transistor 692 also increases linearly with respect to the control current. This will result in the current in transistor 690 and consequently transistor 688 increasing once the current through 692 increases above the threshold set by current source 684. This threshold is set to occur when the control current exceeds the control current level for adjusting the slope of the current limit threshold as a function of the control current ($I_{CL}$ 460 in FIG. 4). Once this threshold is exceeded, transistor 688 is designed such that it will conduct the amount of additional current required to adjust the slope of the current limit threshold as a function of the control current to the desired level.

In one embodiment, the shunt regulator block is used to maintain a control terminal regulation voltage at control terminal 545. In one embodiment, the control terminal regulation voltage is approximately 5.7 volts. The pulse width modulator implements voltage mode control by driving the power switch with a duty cycle inversely proportional to the current into the control terminal that is in excess of a shunt regulator current threshold. The shunt regulator current is the control terminal current that exceeds the internal supply current of the chip. The shunt regulator current passes through transistors 641 and 643. Transistors 643 and 647 form a current mirror. When the shunt regulator current exceeds the threshold set by current source 645, the feedback signal starts modulating the duty cycle of the power switch 547. The current in the resistor 610 is substantially zero until the shunt regulator current threshold set by current source 645 is reached. This feedback current signal is thus extracted using transistor 647. The voltage at the negative input of comparator 657 of control circuit 549 is the extracted feedback voltage signal 644. This extracted feedback voltage 644 modulates the duty cycle based on the shunt regulator current signal in excess of the current source 645 threshold. When the shunt regulator current is below the current source 645 threshold, the voltage at the negative input of comparator 657 will stay high, and the output of comparator 657 will stay low. As the current through the shunt regulator increases, the voltage at the negative input of comparator 657 decreases linearly. The output of comparator 657 will go high at a time during the cycle determined by the shunt regulator current. When the output of comparator 657 goes high, the output of OR gate 659 will go high, and it will reset latch 663. This circuitry maintains the duty cycle to be roughly constant from zero control current up to the control current threshold for duty cycle reduction ($I_{DCS}$ 470 in FIG. 4). After the control current exceeds $I_{DCS}$, the duty cycle of power switch 547 is reduced as a function of the control current to maintain a constant output voltage.

Thus, power supplies utilizing this regulator will exhibit an approximately constant output current characteristic when the control terminal current is below $I_{DCS}$ and an approximately constant output voltage characteristic when the control terminal current is above $I_{DCS}$. The intermediate region of operation is the constant power region, which should be minimized as much as possible.

During power-up, when the voltage across the combined electrical control terminal 545 reaches the control terminal regulation voltage (e.g. 5.7 volts), transistor 629 turns on and pulls the input of inverter 609 high. The output of inverter 609 then goes low to set a latch including NAND gates 611 and 613. The output of NAND gate 613 goes low and the output of inverter 615 goes high. The gate of transistor 605 is pulled high turning on transistor 605, which pulls the gate of transistor 601 low, thereby turning off the high voltage current source of charging circuit 503. In one embodiment, the high voltage current source of charging circuit 503 includes transistor 601.

In one embodiment, the output of NAND gate 613 is also coupled to auto-restart counter 625. When the output of NAND gate 613 goes low, the output of auto-restart counter 625 goes high to enable NAND gate 665, thus enabling power switch 547 to be switched through the output of inverter 669. In one embodiment, power switch 547 includes power MOSFET 673 coupled in series with junction field effect transistor (JFET) 675 between drain terminal 541 and source terminal 543. In another embodiment, it is appreciated that power switch 547 my be implemented using other types of transistor technologies such as for example a bipolar junction transistor or other suitable type of power switch.

In one embodiment, the control terminal regulation voltage of control terminal regulator circuit 509 is set at 5.7V. In one embodiment, there is a capacitor connected externally to control terminal 545. When the switching of power switch 547 begins, the voltage at control terminal 545 would slowly drop without the charging circuit 503. This voltage drop will continue until the output of the power supply reaches it's regulation value.

Under a fault condition, such as for example an output short or open loop, the external capacitor coupled to control terminal 545 will discharge to 4.7V and the output of comparator 627 will go low to reset the latch including of NAND gates 611 and 613, and the output of inverter 615 will go low to turn-off transistor 605. This will enable the charging circuit 503 to charge the external capacitor coupled to control terminal 545. The output of auto-restart counter 625 will also go low disabling the power switch 547 from being switched. In one embodiment, the auto-restart counter 625 can be designed to count up to for example 8 discharge/charge cycles for the output to be enabled again.

Figure 7:
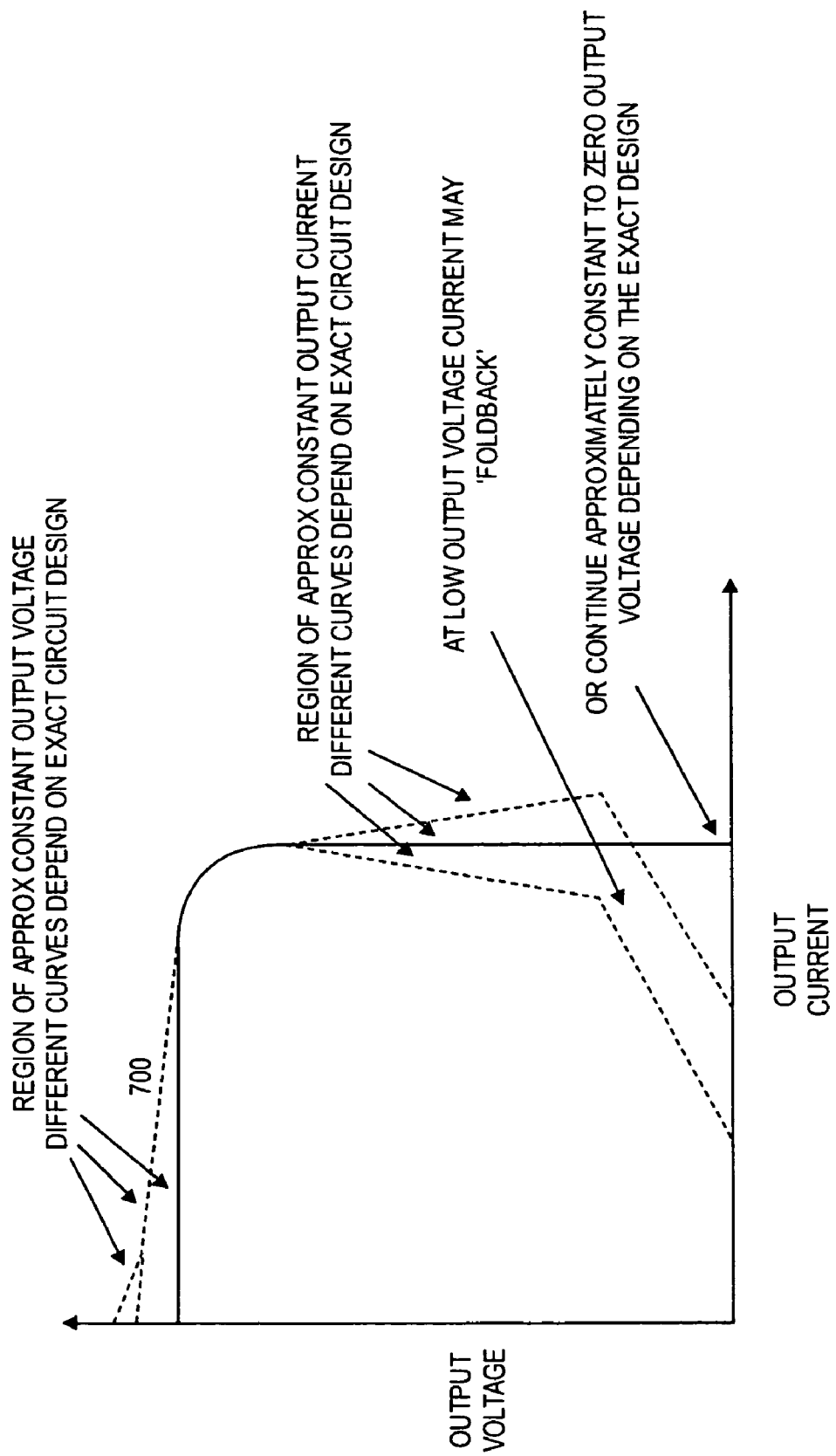
FIG. 7 is a diagram illustrating the typical relationships between the output current and output voltage of one embodiment of a power supply in accordance with the teachings of the present invention.

FIG. 7 is a diagram illustrating the typical relationships between the output current and output voltage of one embodiment of a power supply in accordance with the teachings of the present invention. As can be seen in curve 700, one embodiment of a power supply in accordance with the teachings of the present invention exhibits an approximately constant output current and an approximately constant output voltage characteristic. That is, as output current increases, the output voltage remains approximately constant until the output current reaches an output current threshold. As the output current approaches the output current threshold, the output voltage decreases as the output current remains approximately constant over the drop in output voltage. As shown, the output current may reduce or foldback below a certain output voltage. It is appreciated that the approximately constant output voltage and approximately constant output current characteristics of various embodiments of the present invention are suitable for battery charger applications or the like.

What is claimed is:

1. A method, comprising:
    receiving a control terminal current from a control terminal of a regulator circuit, the control terminal current including a feedback current and an internal supply current;
    generating a shunt regulator current to determine the feedback current;
    switching on and off a power switch coupled between first and second terminals of the regulator circuit in response to a current limit threshold of the power switch to control a current through the power switch; and
    adjusting the current limit threshold of the power switch in response to the feedback current.

2. The method of claim 1 wherein the shunt regulator current is the control terminal current in excess of the internal supply current.

3. The method of claim 1 further comprising increasing the current limit threshold in response to an increase in the feedback current.

4. The method of claim 1 further comprising decreasing the current limit threshold in response to an increase in the feedback current.

5. The method of claim 1 further comprising maintaining an approximately constant output current characteristic at an output of a power supply in response to switching on and off the power switch.

6. The method of claim 5 further comprising maintaining an approximately constant output voltage at the output of the power supply in response to the feedback current.

* * * * *